(12) United States Patent
Sasaki (10) Patent No.: US 11,353,573 B2
(45) Date of Patent: Jun. 7, 2022

(54) RANGING MODULE

(71) Applicant: DENSO CORPORATION, Kariya (JP)

(72) Inventor: Hikaru Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 124 days.

(21) Appl. No.: 16/832,457

(22) Filed: Mar. 27, 2020

(65) Prior Publication Data

US 2020/0309936 A1    Oct. 1, 2020

(30) Foreign Application Priority Data

Mar. 29, 2019    (JP) .............................. JP2019-068006

(51) Int. Cl.
  *G01S 13/42*    (2006.01)
  *G01S 13/44*    (2006.01)
  *G01S 7/03*    (2006.01)

(52) U.S. Cl.
  CPC ........ *G01S 13/426* (2013.01); *G01S 13/4436* (2013.01); *G01S 7/036* (2013.01)

(58) Field of Classification Search
  CPC ...................................................... G01S 13/34
  See application file for complete search history.

(56) References Cited

U.S. PATENT DOCUMENTS

| | | | | |
|---|---|---|---|---|
| 3,978,481 A * | 8/1976 | Angwin | ................ | G01S 13/931 342/59 |
| 6,215,438 B1 * | 4/2001 | Oswald | ................ | G01S 13/931 342/70 |
| 6,400,308 B1 * | 6/2002 | Bell | ...................... | G01S 13/931 342/71 |
| 6,975,246 B1 * | 12/2005 | Trudeau | ................ | G01S 13/931 340/903 |
| 2006/0012467 A1 * | 1/2006 | Kade | ..................... | G01S 13/931 340/435 |
| 2006/0220943 A1 * | 10/2006 | Schlick | ................. | G01S 13/931 342/70 |
| 2015/0378016 A1 * | 12/2015 | Schoor | .................. | G01S 13/345 342/21 |
| 2016/0146933 A1 * | 5/2016 | Rao | ......................... | G01S 13/34 342/132 |

FOREIGN PATENT DOCUMENTS

| JP | 5558440 B | 7/2014 |
|---|---|---|
| JP | 2018-159575 A | 10/2018 |
| JP | 2018-200273 A | 12/2018 |

* cited by examiner

*Primary Examiner* — Bernarr E Gregory
(74) *Attorney, Agent, or Firm* — Maschoff Brennan (57) ABSTRACT

In a ranging module, a first calculator calculates a distance from a processed signal corresponding to a current pixel. A determiner determines whether the distance calculated by the first calculator differs from a preset limit distance. A re-extractor is configured to, in response to the determiner determining that the distance differs from the preset limit distance, extract pieces of data of processing sections each corresponding to a sweep time of a transmission wave from a time-series of the processed signals saved in a data storage corresponding from a pixel previous to the current pixel in a scanning direction of a scanner to the current pixel while shifting the processing sections one after the other by a time period shorter than the sweep time. A second calculator calculates the distance from the data of each processing section extracted by the re-extractor.

4 Claims, 12 Drawing Sheets

RANGING MODULE

CROSS-REFERENCE TO RELATED APPLICATION

This application is based on and claims the benefit of priority from earlier Japanese Patent Application No. 2019-68006 filed Mar. 29, 2019, the description of which is incorporated herein by reference.

BACKGROUND

Technical Field

The present disclosure relates to a ranging technique using electromagnetic waves.

Related Art

A known object detection apparatus determines a kind of object based on images taken by a camera. If the kind of object is a pedestrian, the object detection apparatus scans an electromagnetic wave in an angular resolution finer than usual using radar to improve the spatial resolution.

DESCRIPTION OF SPECIFIC EMBODIMENT

The object detection apparatus, as disclosed in Japanese Patent No. 5558440, has a complicated structure since systems other than the radar (such as a camera) are required to improve the spatial resolution of detection by the radar. If the electromagnetic wave is scanned in fine angular resolution all the time, the spatial resolution of the object detection by the radar will be improved without using other systems. This will, however, increase the scanning time per frame and undesirably decrease the frame rate.

In view of the foregoing, it is desired to have a ranging module that improves the spatial resolution and maintains the frame rate without using other systems.

One aspect of the present disclosure provides a ranging module including a transmission driver, a transmitter, a scanner, a scan driver, a receiver, a signal converter, a data storage, a first calculator, a determiner, a re-extractor, and a second calculator. The transmission driver is configured to generate a transmission wave, which is a frequency-swept electromagnetic wave. The transmitter is configured to transmit the transmission wave repeatedly. The scanner is configured to continuously scan the transmission wave transmitted from the transmitter without stopping in space. The scan driver is configured to drive the scanner. The receiver is configured to receive a reflected wave generated by reflection of the transmission wave off an object. The signal converter is configured to convert a combined signal, which is generated by combining the transmission wave and the reflected wave per pixel, into an electrical signal. The data storage is configured to sequentially save a processed signal based on the electrical signal converted by the signal converter. The first calculator is configured to calculate a distance from the processed signal corresponding to a current pixel. The determiner is configured to determine whether the distance calculated by the first calculator differs from a preset limit distance. The re-extractor is configured to, in response to the determiner determining that the distance differs from the preset limit distance, extract pieces of data of processing sections each corresponding to a sweep time of the transmission wave from a time-series of the processed signals saved in the data storage corresponding from a pixel previous to the current pixel in a scanning direction of the scanner to the current pixel while shifting the processing sections one after the other (or sequentially) by a time period shorter than the sweep time. The second calculator is configured to calculate the distance from the data of each processing section extracted by the re-extractor.

According to one aspect of the present disclosure, the processed signal for each pixel is sequentially saved. The distance is calculated from the processed signal corresponding to the current pixel. If an object exists, the calculated distance differs from the limit distance. Therefore, it is determined whether the calculated distance differs from the limit distance to determine whether the object exists. If it is determined that the distance differs from the limit distance, the pieces of data of the processing sections each corresponding to the sweep time are extracted from the time-series of the saved processed signals. The processing sections are shifted one after the other by a time period shorter than the processing section. Furthermore, the distance is calculated from the data of each processing section that has been extracted. Thus, the distance to the object is detected with an improved spatial resolution and a maintained frame rate without using other systems.

Hereinafter, exemplary embodiments of the present disclosure will be described in detail with reference to the accompanying drawings, in which like reference numerals

First Embodiment

1. Configuration

Figure 1:
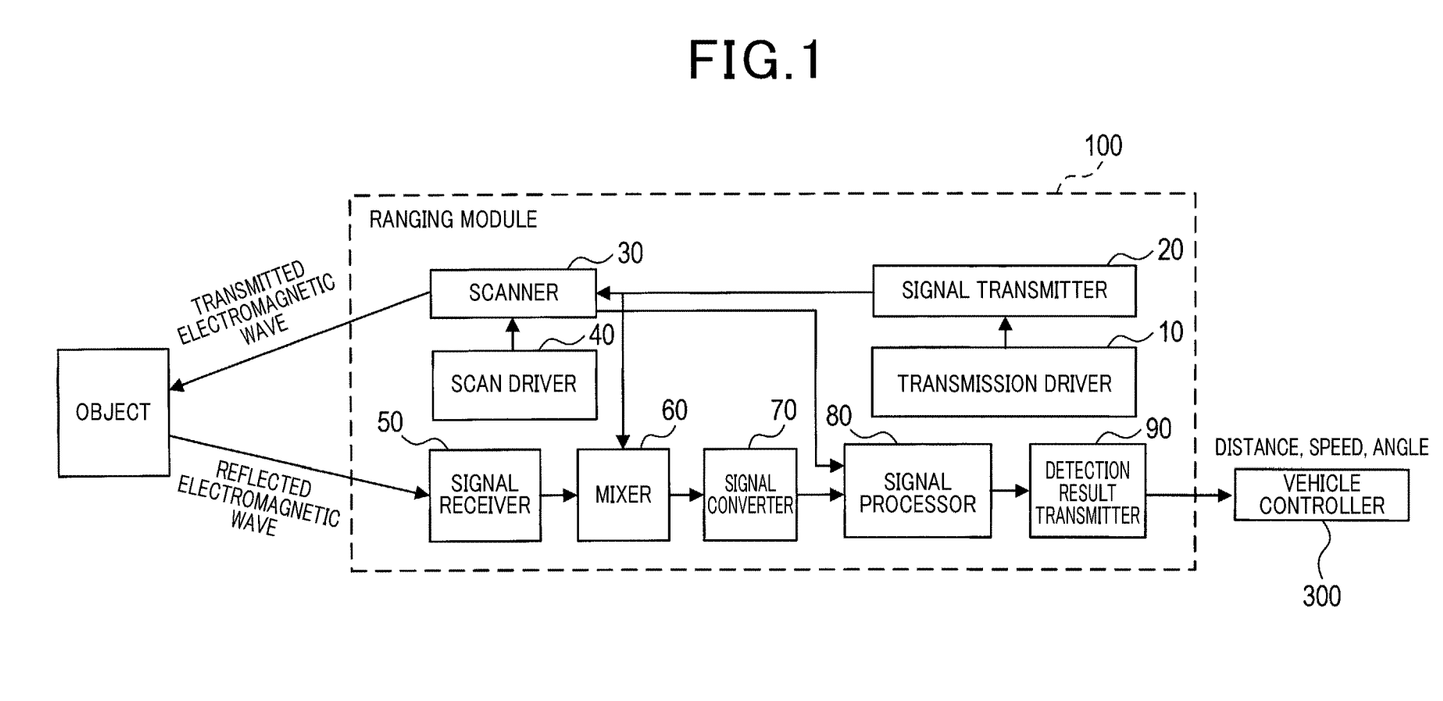
FIG. 1 is a block diagram illustrating the configuration of a ranging module according to a first embodiment.
Figure 2:
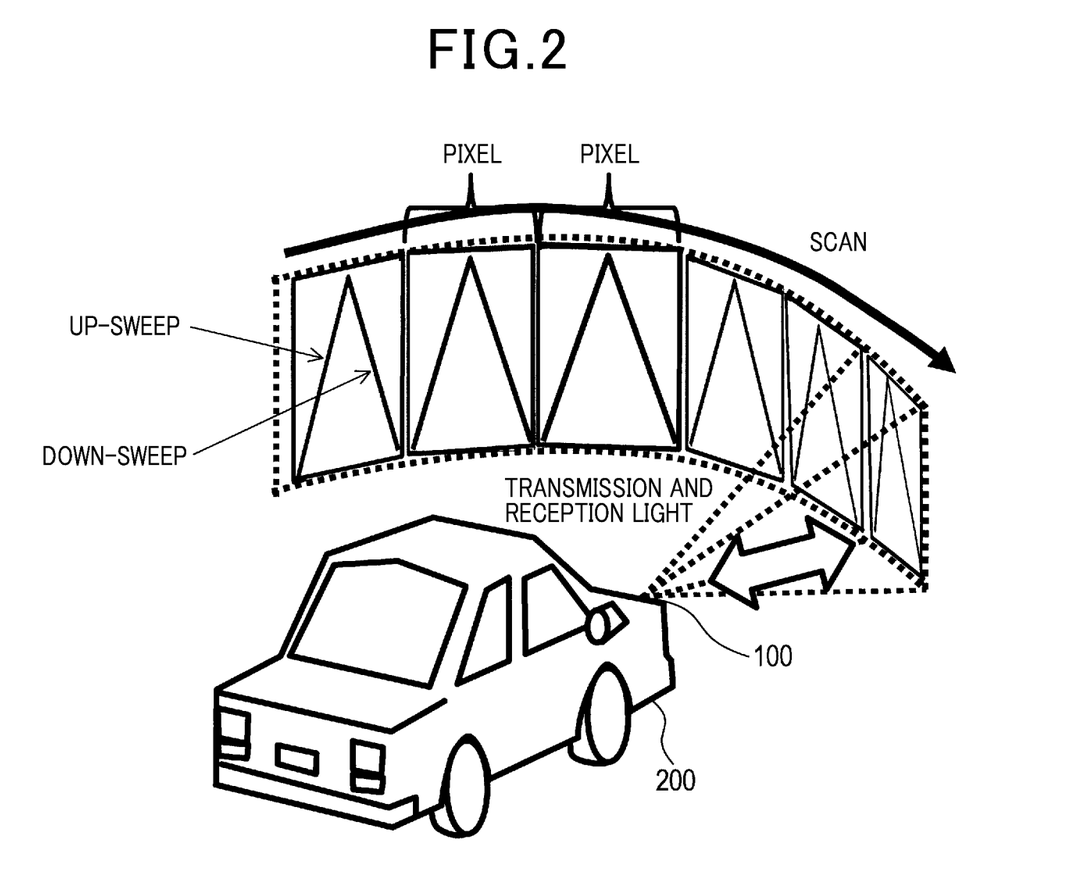
FIG. 2 is a diagram illustrating the manner in which a laser beam is continuously scanned.

The functional configuration of a ranging module 100 will be described with reference to FIG. 1. In the first embodiment, as shown in FIG. 2, the ranging module 100 is mounted on a vehicle 200.

The ranging module 100 includes functions of a transmission driver 10, a signal transmitter 20, a scanner 30, a scan driver 40, a signal receiver 50, a mixer 60, a signal converter 70, a signal processor 80, and a detection result transmitter 90.

The transmission driver 10 outputs, to the signal transmitter 20, a drive signal to generate a frequency-swept electromagnetic wave. The frequency-swept electromagnetic wave is an electromagnetic wave that is modulated so that the frequency is continuously increased, the frequency is continuously decreased, or both. In the present embodiment, as shown in FIG. 2, the electromagnetic wave including an up-sweep followed by a down-sweep is transmitted. That is, the ranging module 100 is a frequency modulated continuous wave (hereinafter, referred to as FMCW) sensor. In this embodiment, the time period from when the up-sweep is started to when the down-sweep is completed, that is, the transmission time period of the electromagnetic wave corresponding to each pixel is referred to as a sweep time TM.

The signal transmitter 20 repeatedly transmits the frequency-swept electromagnetic wave (hereinafter, referred to as the transmission wave) in response to the drive signal output from the transmission driver 10.

The scanner 30 is driven by the scan driver 40 to continuously scan the transmission wave transmitted from the signal transmitter 20 without stopping in space. FIG. 2 shows the manner in which the transmission wave is scanned in the horizontal direction. After a predetermined region has been scanned, the scanner 30 scans the region above or below the scanned region again in the horizontal direction. The scanner 30 may scan the transmission wave in the vertical direction. In this case, after the predetermined region has been scanned, the scanner 30 scans the region on the left or on the right of the scanned region again in the vertical direction.

The signal receiver 50 receives a reflected wave generated when the transmission wave is reflected off an object. The mixer 60 combines the transmission wave and the reflected wave to generate a combined signal. The combined signal corresponds to a beat signal of the transmission wave and the reflected wave. The signal converter 70 converts the combined signal generated by the mixer 60 to a processed signal, which is an electrical signal.

The signal processor 80 calculates the distance from the vehicle 200 to the object, the speed of the object relative to the vehicle 200 (hereinafter, referred to as the speed), and the angle of the object with respect to the vehicle 200 based on the electrical signal converted by the signal converter 70. The signal processor 80 will be described in detail below.

The detection result transmitter 90 transmits the distance, the speed, and the angle calculated by the signal processor 80 to the vehicle controller 300. The vehicle controller 300 executes, for example, a driving support control procedure or an automated driving control procedure.

Figure 3:
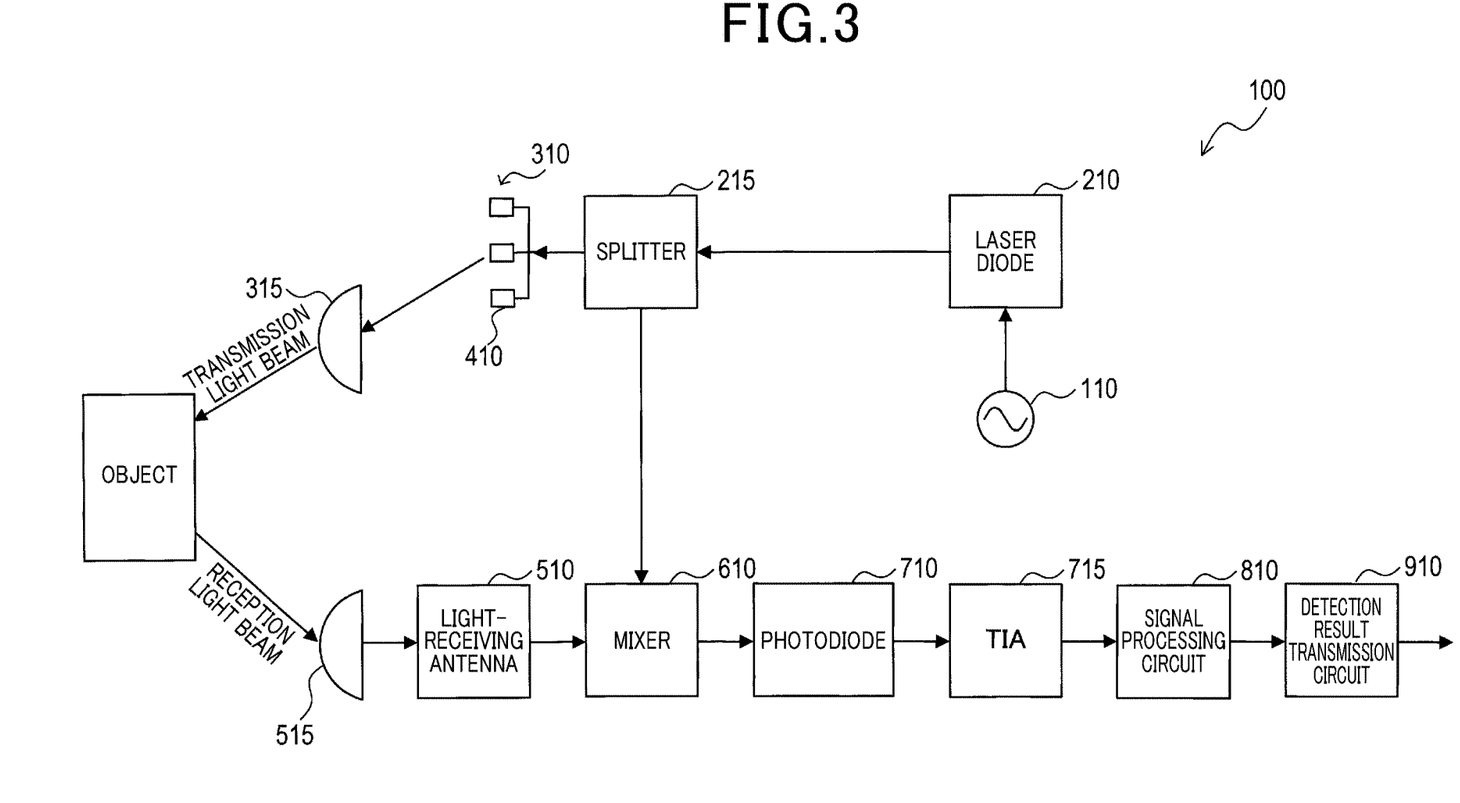
FIG. 3 is a block diagram illustrating the configuration of a LiDAR module according to the first embodiment.

Next, an example in which the ranging module 100 is configured by a LiDAR (that is, a laser radar) module will be described with reference to FIG. 3.

The LiDAR module 100 includes a laser drive circuit 110, a laser diode 210, a splitter 215, an optical phased array (hereinafter, referred to as OPA) 310, a phase shifter 410, a diffusion lens 315, a collecting lens 515, a light-receiving antenna 510, a mixer 610, a photodiode 710, a transimpedance amplifier (hereinafter, referred to as TIA) 715, a signal processing circuit 810, and a detection result transmission circuit 910.

The laser drive circuit 110 corresponds to the transmission driver 10 and outputs a drive signal to the laser diode 210. The laser diode 210 corresponds to the signal transmitter 20 and emits a transmission light beam that has a frequency and a strength based on the drive signal output from the laser drive circuit 110.

The splitter 215 is constituted by, for example, a coupler including branched optical waveguides. The splitter 215 receives the transmission light beam emitted from the laser diode 210. A portion of the transmission light beam input to the splitter 215 enters the OPA 310 corresponding to the scanner 30, and the remaining portion enters the mixer 610.

The transmission light beam that has entered the OPA 310 branches into the optical waveguides. The phase shifter 410 corresponds to the scan driver 40 and is provided on each of the optical waveguides. The phase shifter 410 changes the phase of the transmission light beam that passes through each optical waveguide in accordance with an electrical signal input from a non-illustrated control circuit. Thus, the directionality of the transmission light beam that exits from each optical waveguide is changed, and the transmission light beam is scanned in the horizontal direction.

Instead of the OPA 310 and the phase shifter 410, a mirror and a mirror drive circuit may be provided. In this case, a portion of the transmission light beam that enters the splitter 215 hits the mirror and is reflected off the mirror. The mirror is rotated by the mirror drive circuit so that the transmission light beam reflected off the mirror is scanned in the horizontal direction.

The diffusion lens 315 diffuses the incoming transmission light beam to form a line beam.

The collecting lens 515 collects the reflected light beams generated by the reflection of the transmission light beams off the object and outputs the collected light beams to the light-receiving antenna 510. The light-receiving antenna 510 corresponds to the signal receiver 50 and has a diffraction grating structure. A bandpass filter and a polarizing filter, which are not shown, are stacked on the light-receiving antenna 510. Thus, the light-receiving antenna 510 receives a reflected light beam in a predetermined frequency band from which light of an unwanted noise component has been removed and which is polarized in a predetermined direction.

The mixer 610 corresponds to the mixer 60 and combines the input transmission light beam and reception light beam to generate a combined signal, which is an optical signal. The photodiode 710 and the TIA 715 correspond to the signal converter 70. The photodiode 710 converts the combined signal input from the mixer 610 to a current signal and outputs the current signal. The TIA 715 converts the current signal input from the photodiode 710 to a voltage signal and outputs the voltage signal.

The signal processing circuit 810 corresponds to the signal processor 80 and includes, for example, an AD converting circuit or a high-speed Fourier transform circuit. The signal processing circuit 810 converts the input voltage signal to a processed signal, which is a digital signal, and executes a frequency analysis of the converted digital signal to calculate the distance and the speed of the object. Additionally, the signal processing circuit 810 calculates the angle of the object based on the scanning direction of the transmission light beam.

The detection result transmission circuit 910 corresponds to the detection result transmitter 90 and transmits the distance, the speed, and the angle of the object input from the signal processing circuit 810 to the vehicle controller 300.

Figure 4:
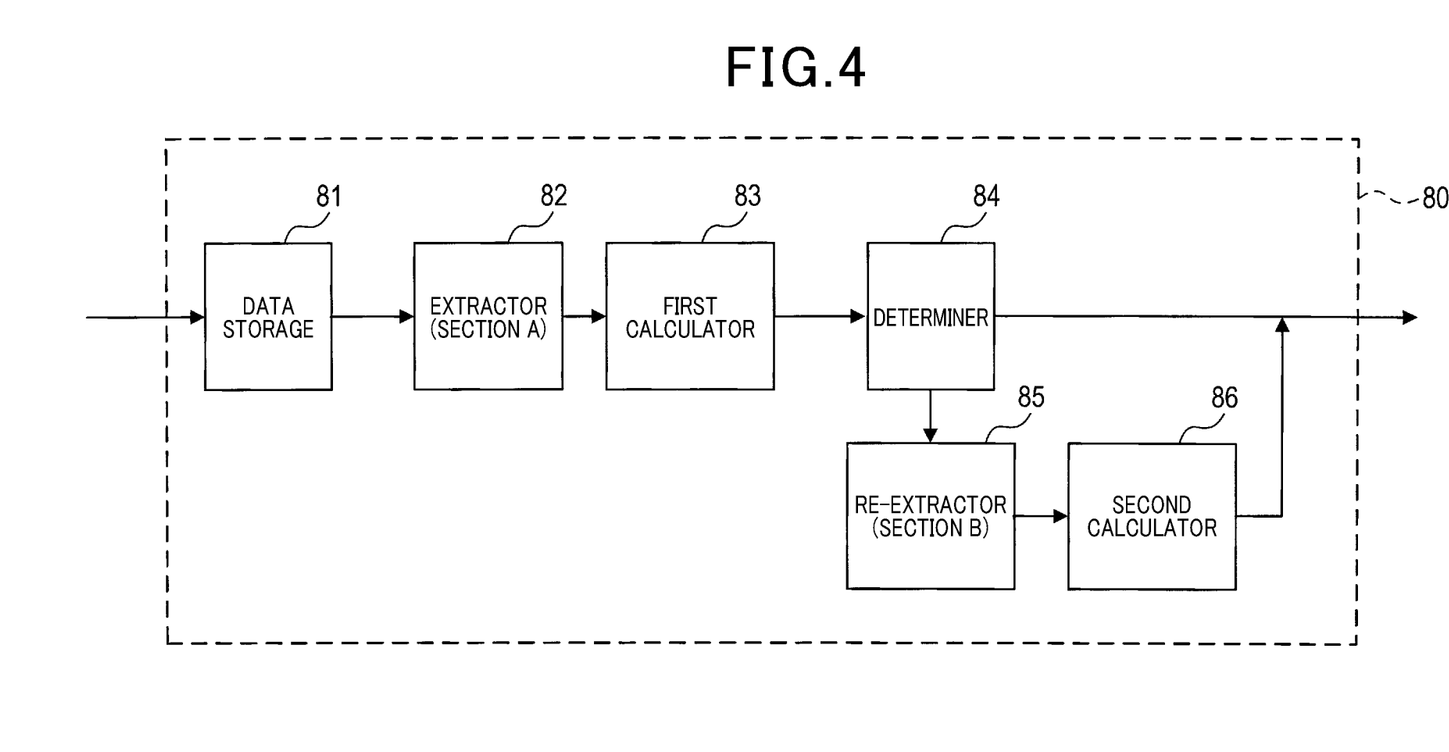
FIG. 4 is a block diagram illustrating the detailed configuration of a signal processor.

Subsequently, the functional configuration of the signal processor 80 will be described with reference to FIG. 4. The signal processor 80 includes functions of a data storage 81, an extractor 82, a first calculator 83, a determiner 84, a re-extractor 85, and a second calculator 86.

The data storage 81 sequentially saves the processed signal of each pixel.

Figure 5:
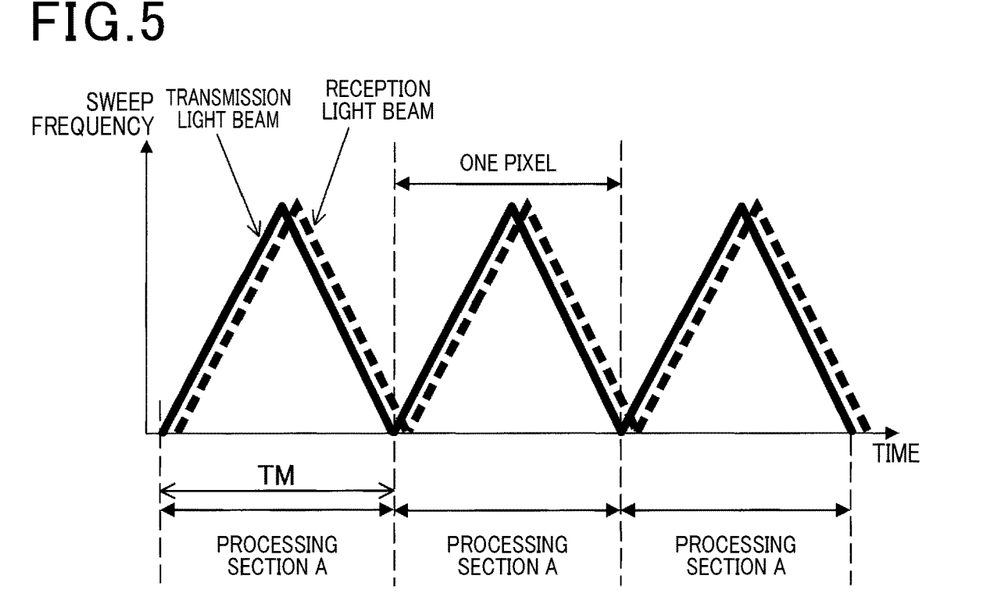
FIG. 5 is a diagram illustrating a transmission light beam and a reception light beam corresponding to three pixels.

The extractor 82 extracts, as shown in FIG. 5, the data of a processing section A corresponding to the current pixel from the time-series of the processed signals saved in the data storage 81.

The first calculator 83 executes a frequency analysis of the data of the processing section A extracted by the extractor 82, that is, the processed signal corresponding to the current pixel to calculate the distance and the speed of the object. The first calculator 83 also calculates the angle of the object from the scanning direction.

The determiner 84 determines whether the distance calculated by the first calculator 83 differs from (or is within) a limit distance. The limit distance is a preset maximum distance that can be ranged, and if an object does not exist within the range of the limit distance, the distance calculated by the first calculator 83 will be the limit distance. That is, the determiner 84 determines whether the object exists.

More specifically, if the current distance calculated by the first calculator 83 is changed from the distance calculated immediately before by the first calculator 83 by a judgement threshold value or more, the determiner 84 determines that the current distance differs from the limit distance. That is, if the difference between the current distance and the previous distance is greater than or equal to the judgement threshold value, the determiner 84 determines that the current distance differs from the limit distance. The current distance is the distance calculated by the first calculator 83 from the processed signal of the current pixel. The previous distance is the distance calculated by the first calculator 83 from the processed signal of the pixel previous to the current pixel (more specifically, the immediately preceding pixel) in the scanning direction of the transmission light beam.

Figure 6:
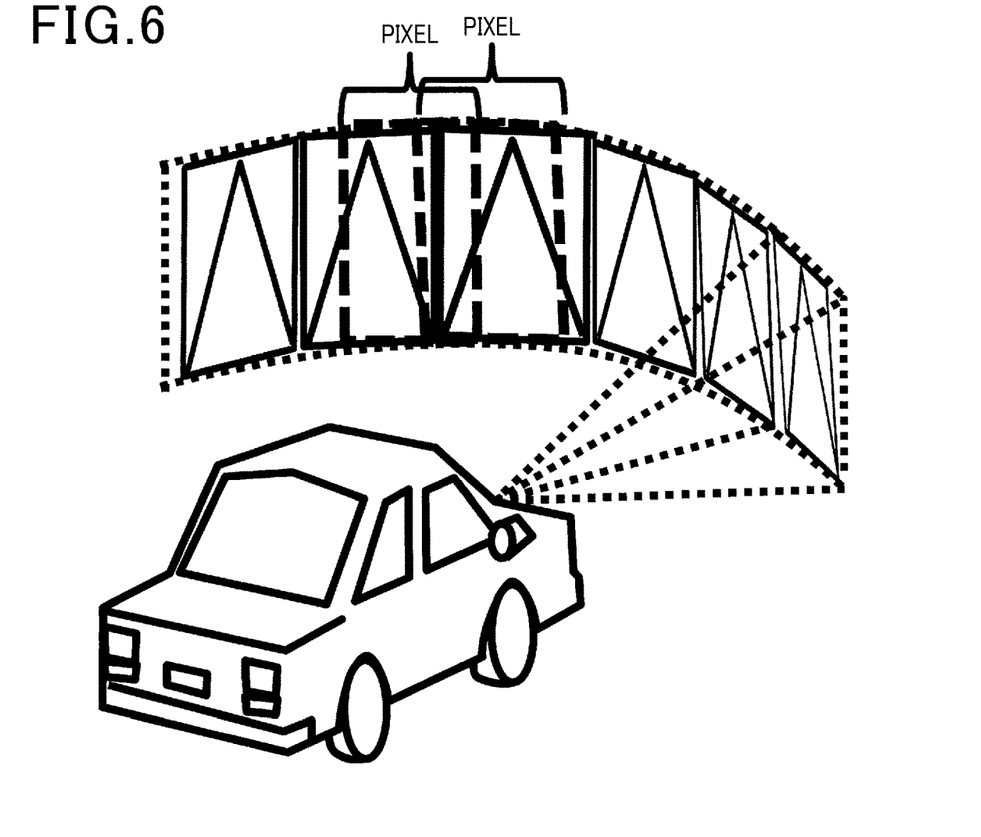
FIG. 6 is a conceptual diagram illustrating the manner in which multiple pixels are extracted while being shifted one after the other by a predetermined time period from the continuously scanned pixels.
Figure 7:
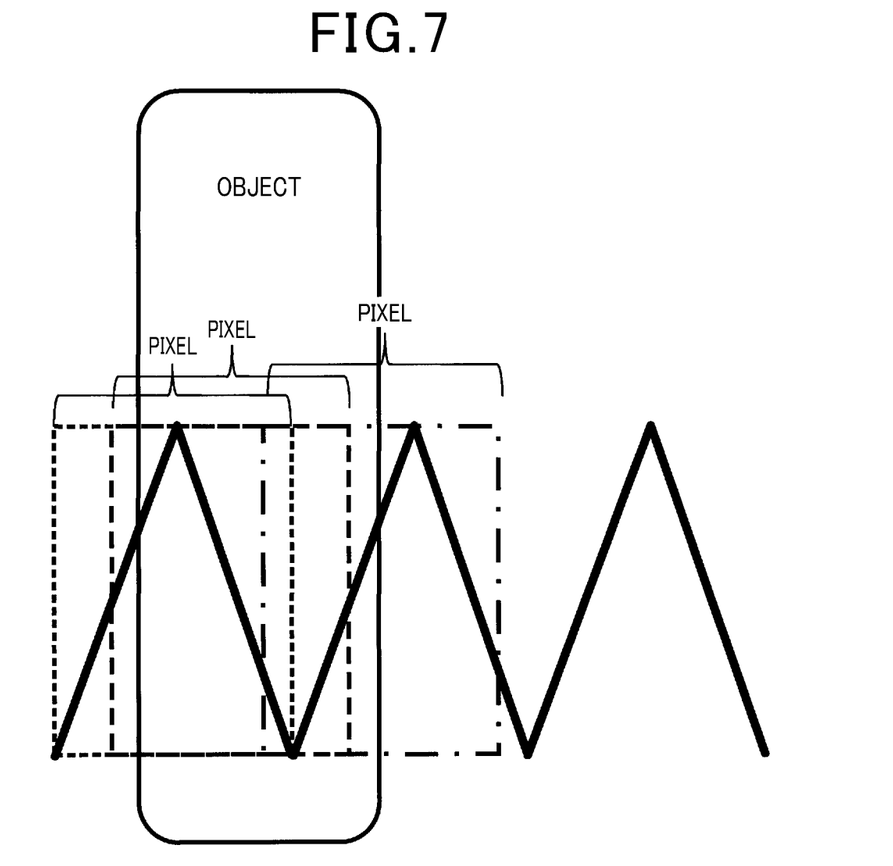
FIG. 7 is a conceptual diagram illustrating the manner in which multiple pixels are extracted while being shifted one after the other by the predetermined time period starting within both the pixel in which an object is determined to exist and the pixel immediately preceding that pixel.
Figure 8:
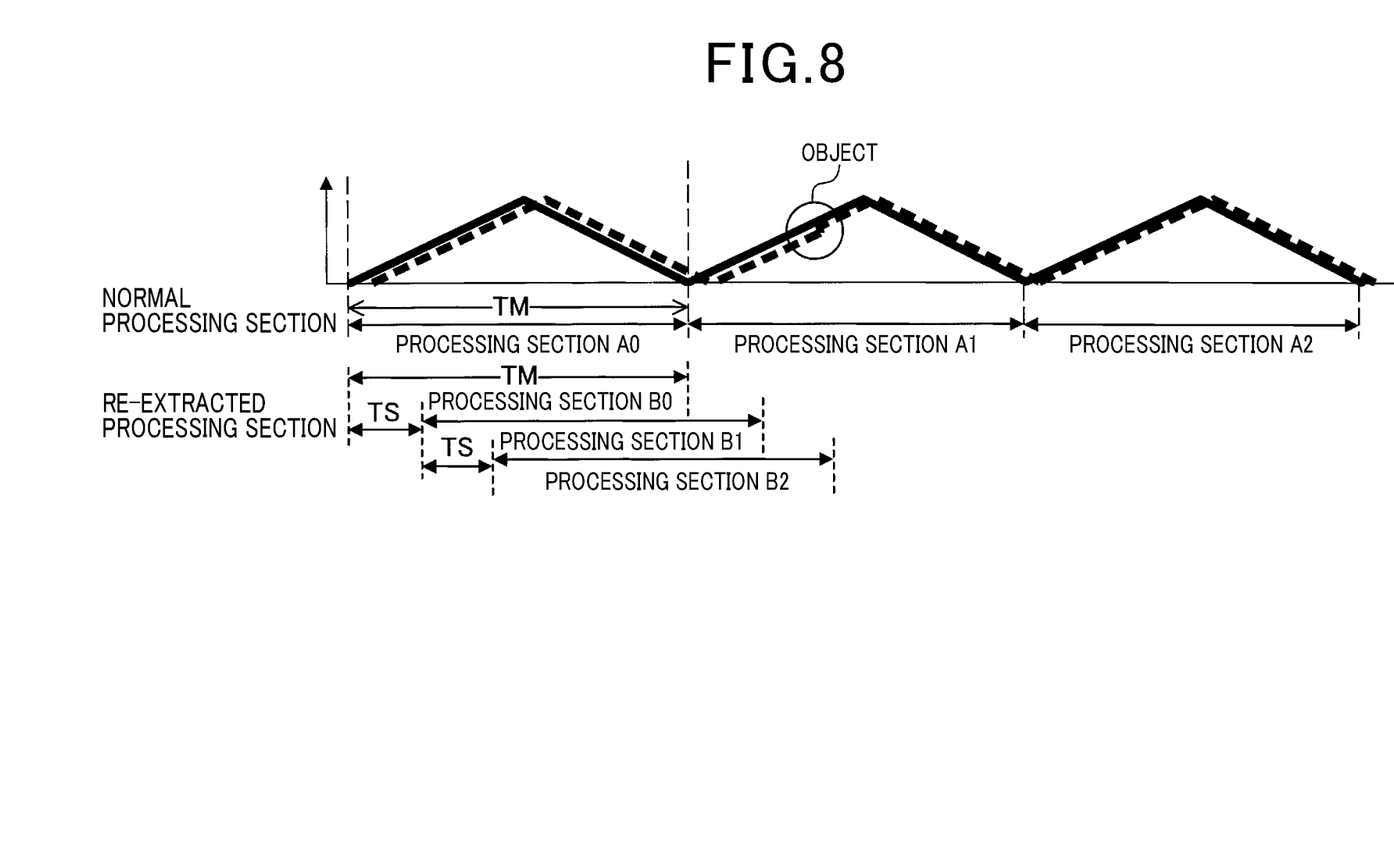
FIG. 8 is a diagram illustrating the manner in which multiple processing sections are extracted while being shifted one after the other by the predetermined time period starting within the processing section in which the object is determined to exist and the processing section immediately preceding that processing section.

If the determiner 84 determines that the current distance differs from the limit distance, as shown in FIGS. 6 to 8, the re-extractor 85 extracts the data of processing sections B shifted one after the other by a time TS from the time-series of the processed signals saved in the data storage 81. Each processing section B is a section corresponding to the sweep time TM like the processing section A. That is, the processing section B is a section corresponding to each pixel. The time TS is shorter than the processing section B. That is, while the processing section A corresponds to the time period from when the up-sweep is started to when the down-sweep is completed, the processing section B starts from a point in the middle of the up-sweep or the down-sweep and has a time length equivalent to each pixel.

A re-extracting process will be described in detail with reference to FIG. 8. FIG. 8 shows an example in which the distance calculated in one of the three consecutive processing sections A0, A1, and A2 (in this example, the processing section A1) is changed by the judgement threshold value or more from the distance calculated in the processing section A0. In this case, the re-extractor 85 extracts processing sections B0, B1, B2, and so on shifted one after the other by the time TS which starts within the time-series of the data of the processing section A0 immediately preceding the processing section A1 and the data of the processing section A1. That is, the re-extractor 85 extracts the processing sections B0, B1, B2, and so on while shifting, within a time period from the starting point in the processing section A0 to the terminating point in the processing section A1, the starting points of these processing sections one after the other by the time TS.

The second calculator 86 calculates the distance, the speed, and the angle of the object from the data of each processing section B extracted by the re-extractor 85. The first calculator 83 calculates the distance with a spatial resolution corresponding to the sweep time TM. The second calculator 86 calculates the distance with a spatial resolution corresponding to the time TS. In the present embodiment, the first calculator 83 and the second calculator 86 are separate. However, a single calculator may calculate, for example, the distance from the processing section A and from the processing section B.

2. Process

Figure 9:
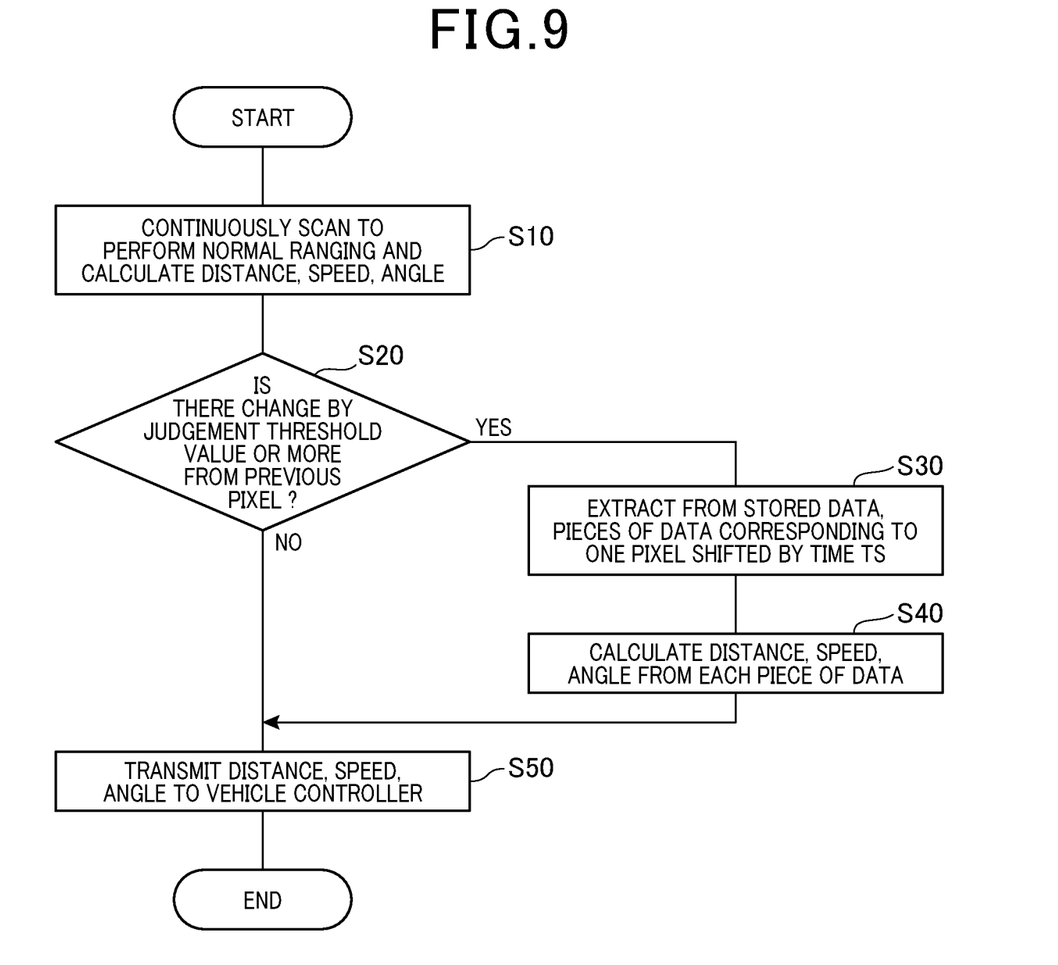
FIG. 9 is a flowchart showing the routine for detecting an object.

Next, the routine for detecting the object executed by the signal processor 80 will be described with reference to the flowchart of FIG. 9. The signal processor 80 executes the routine per pixel.

At step S10, the signal processor 80 continuously scans the transmission light beam to perform the normal ranging process and calculates the distance, the speed, and the angle of the object from the data of the processing section A.

Subsequently, at step S20, it is determined whether the distance calculated in the current pixel has changed from the distance calculated in the immediately preceding pixel by the judgement threshold value or more. If it is determined that the change is greater than or equal to the judgement threshold value, the process proceeds to step S30, and if it is determined that the change is not greater than or equal to the judgement threshold value, the process proceeds to step S50.

At step S30, the pieces of data of the processing sections B shifted one after the other by the time TS are extracted, where starting points of the processing sections B are within the time-series of the processed signal corresponding to the pixel immediately preceding the current pixel in the scanning direction and the processed signal corresponding to the current pixel.

At step S40, the distance, the speed, and the angle of the object are calculated from the data of each processing section B extracted at step S30.

At step S50, the distance, the speed, and the angle of the object that have been calculated are transmitted to the vehicle controller 300. The routine is terminated.

3. Simulations

Figure 10:
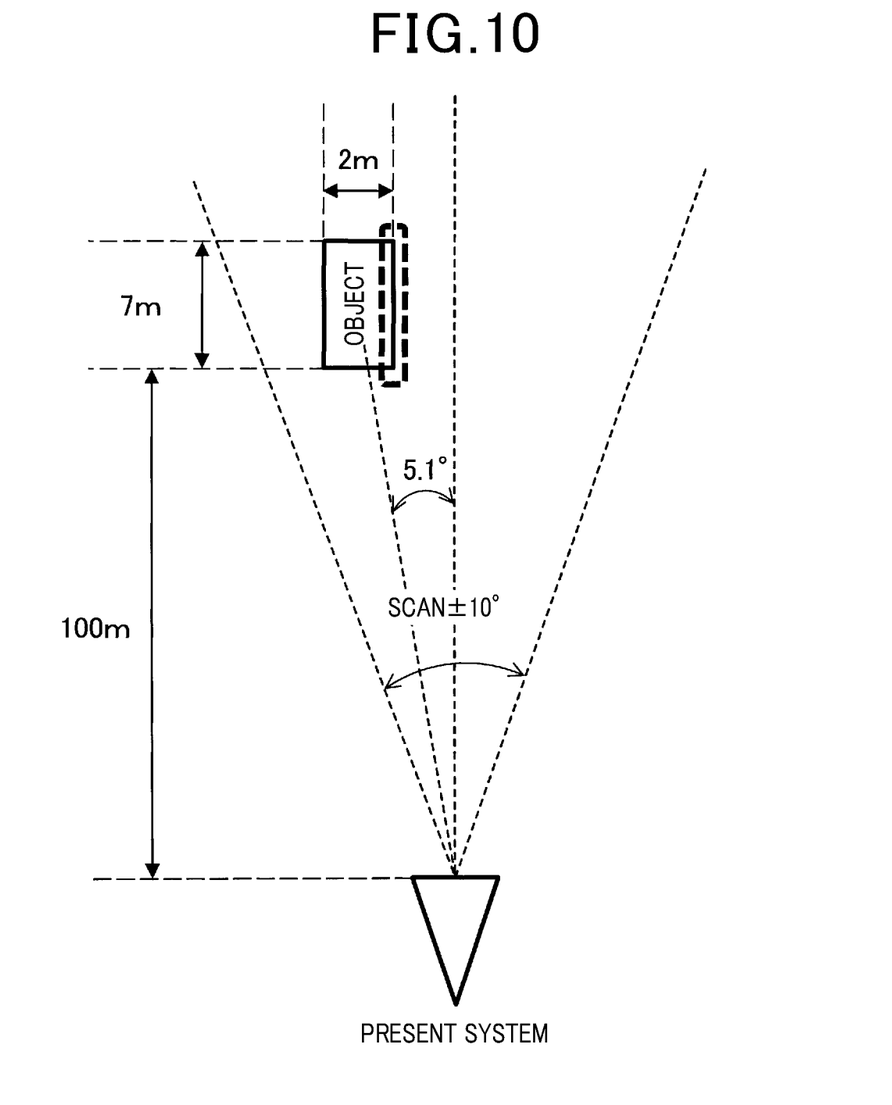
FIG. 10 is a diagram showing simulation conditions.

Next, the simulation result obtained when the present embodiment is applied will be described with reference to FIGS. 10 to 12. FIG. 10 shows simulation conditions. The object has a width of 2 m and a length of 7 m and is located at a distance of 100 m from the LiDAR module 100. The sweep time TM of the transmission light beam is 32 μsec, and the time TS is 8 μsec. The transmission light beam is scanned from the left to the right, and the scanning speed is 20 frames per second (fps). The limit distance is 120 m, and the judgement threshold value is 0.1 m.

Figure 11:
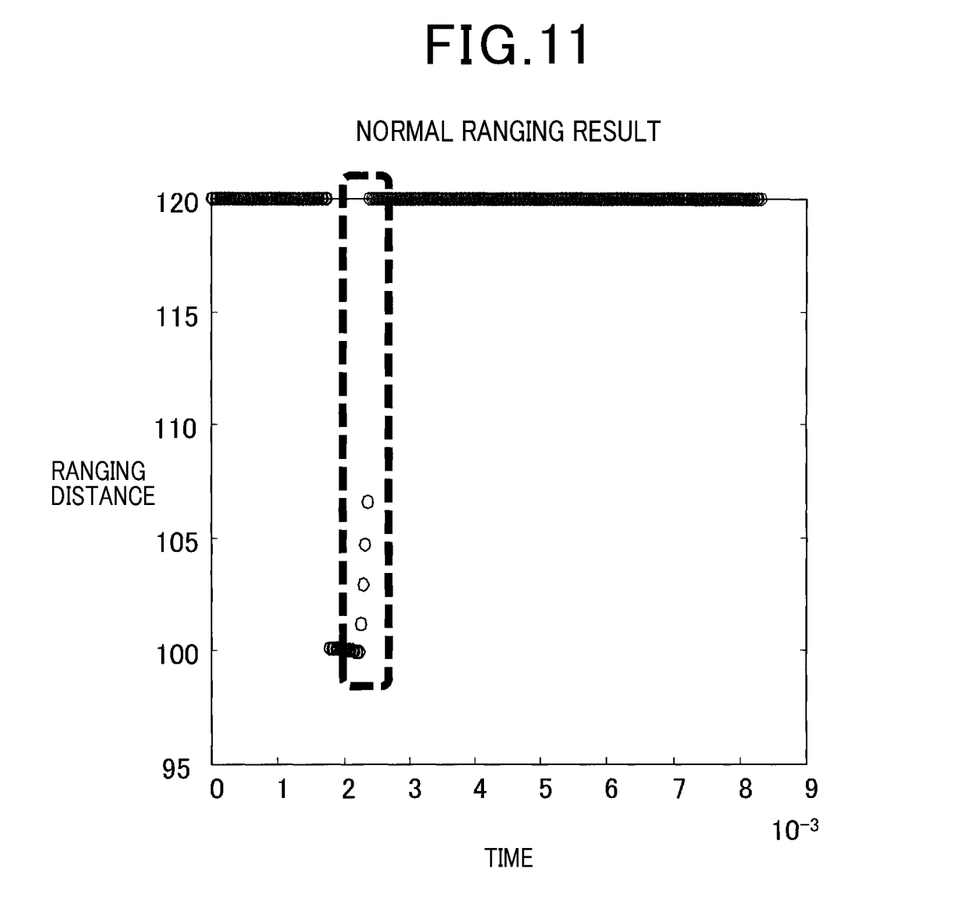
FIG. 11 is a graph showing the simulation result of normal ranging.
Figure 12:
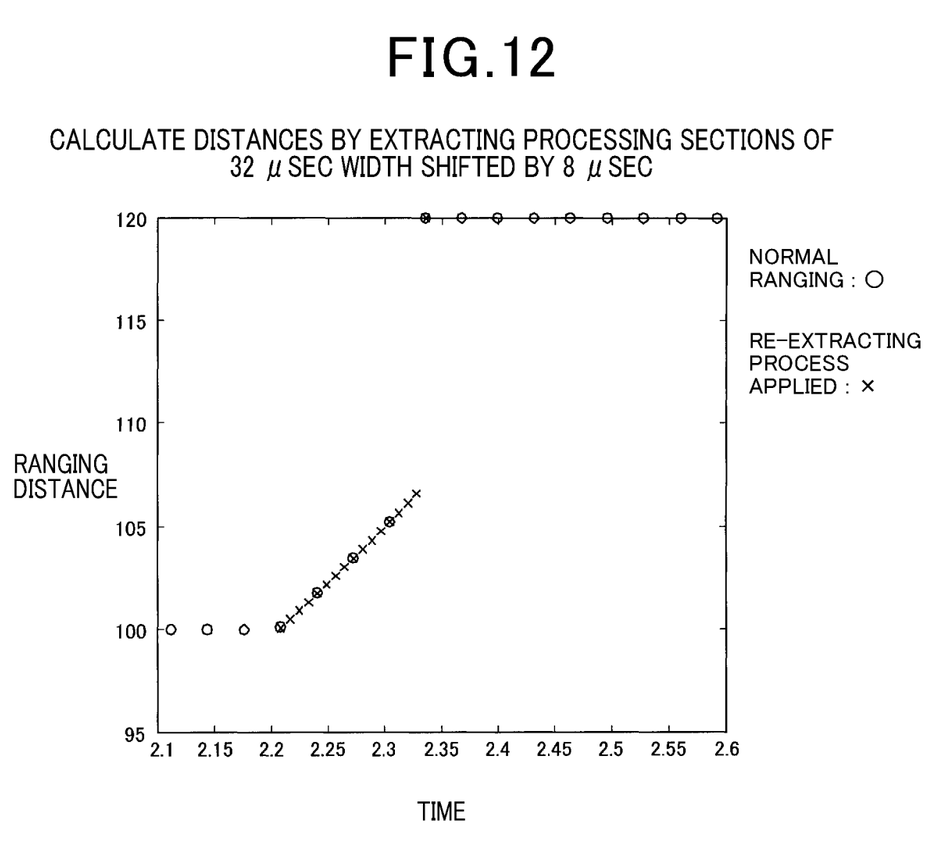
FIG. 12 is a graph showing the simulation result of ranging using a re-extracting process.

FIG. 11 shows the result obtained when the normal ranging process is executed under the simulation conditions shown in FIG. 10. That is, FIG. 11 shows the result obtained when the distance is calculated from the data of the processing section A. The change in the distance exceeding the judgement threshold value is detected in the section surrounded by the dashed line. FIG. 12 shows the result of the calculation of the distance from the pieces of data of the processing sections B obtained by executing the re-extracting process in the section surrounded by the dashed line in FIG. 11. In FIG. 12, the circles indicate the distances calculated from the pieces of data of the processing sections A, and the crosses indicate the distances calculated from the pieces of data of the processing sections B. By executing the re-extracting process, the distance to the object is calculated with a spatial resolution higher than that of the normal ranging process, and the outline of the object is detected with a high accuracy.

4. Advantages

The first embodiment described above has the following advantages.

(1) The processed signal for each pixel is sequentially saved in the data storage 81, and the distance is calculated from the processed signal corresponding to the current pixel. If it is determined that the calculated distance has changed from the distance calculated in the immediately preceding pixel by the judgement threshold value or more, the pieces of data of the processing sections B shifted one after the other by the time TS are extracted from the time-series of the saved processed signals. Furthermore, the distance is calculated from each of the pieces of extracted data of the processing sections B. Thus, the distance to the object is detected with an improved spatial resolution without decreasing the frame rate.

(2) If the distance has changed by the judgement threshold value or more in the scanning direction, it is determined that the object exists.

(3) The rapid change in the distance is detected by comparing the distance calculated in the current pixel with the distance calculated in the immediately preceding pixel. Thus, the existence of the object is determined with a high accuracy.

(4) If the distance changes, so that it is determined that the object exists, the pieces of data of the processing sections B are extracted from the acquired processed signals in the vicinity of the object. The distance is calculated from the data of each extracted processing section B. This improves the spatial resolution around the position where the object is determined to exist to detect the distance to the object.

Second Embodiment

1. Differences from First Embodiment

Since the basic structure of the second embodiment is the same as that of the first embodiment, the descriptions of the same structure will be omitted and the differences will mainly be discussed. The reference numerals that are the same as those in the first embodiment refer to the same components, and the preceding description will be referred to.

In the above-described first embodiment, the ranging module 100 is configured by the LiDAR module. In contrast, the second embodiment differs from the first embodiment in that the ranging module 100 is configured by a millimeter-wave radar module.

Figure 13:
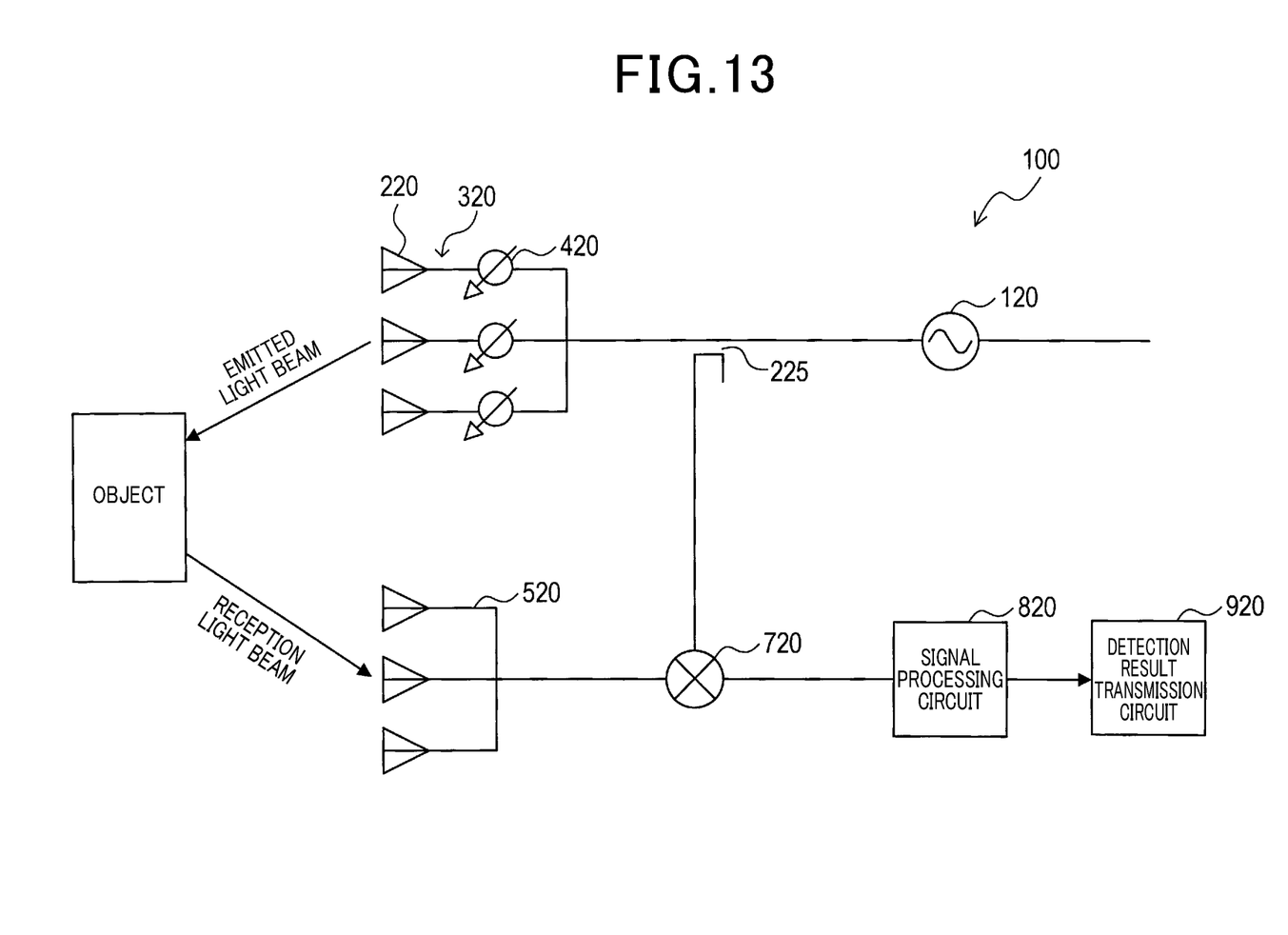
FIG. 13 is a block diagram illustrating the configuration of a millimeter-wave radar module according to a second embodiment.

Next, the configuration of the millimeter-wave radar module 100 will be described with reference to FIG. 13. The millimeter-wave radar module 100 includes an oscillator 120, a distributor 225, a phased array antenna 320, a phase shifters 420, receiving antennas 520, a mixer 720, a signal processing circuit 820, and a detection result transmission circuit 920.

The oscillator 120 corresponds to the transmission driver 10 and generates a frequency-swept transmission wave in a millimeter-wave band. The distributor 225 performs power distribution of a transmission wave output from the oscillator 120. A portion of the transmission wave input to the distributor 225 is input to the phased array antenna 320, and the remaining portion is input to the mixer 720.

The phased array antenna 320 corresponds to the scanner 30 and includes transmission antennas 220. The phase shifters 420 correspond to the scan driver 40 and change the phase of the transmission wave input to each transmission antenna 220 in response to an electrical signal input from a non-illustrated control circuit. The transmission antennas 220 correspond to the signal transmitter 20 and radiates the transmission wave having the phase controlled by the phase shifter 420. This changes the directionality of the transmission wave that radiates from each transmission antenna 220, and the transmission wave is scanned in the horizontal direction.

The receiving antennas 520 correspond to the signal receiver 50 and receive the reflected wave generated by the reflection of the transmission wave off the object. The mixer 720 corresponds to the mixer 60. The mixer 720 combines the input transmission wave and the received wave to generate a combined signal and converts the generated combined signal to a processed signal, which is an electrical signal.

The signal processing circuit 820 corresponds to the signal processor 80 and includes, for example, an AD converting circuit or a high-speed Fourier transform circuit. The signal processing circuit 820 converts the input processed signal to a digital signal, performs a frequency analysis of the converted digital signal, and calculates the distance and the speed of the object. Additionally, the signal processing circuit 820 estimates the direction of the object (that is, the angle of the object) using a direction-of-arrival estimation algorithm such as multiple signal classification (MUSIC).

The detection result transmission circuit 920 corresponds to the detection result transmitter 90 and transmits the distance, the speed, and the angle of the object input from the signal processing circuit 820 to the vehicle controller 300.

2. Advantages

The second embodiment has the same advantages as the first embodiment.

Modifications

Although the embodiments of the present disclosure have been described, the present disclosure is not limited to the above embodiments and can be modified in various forms.

(a) In the above-described embodiments, the signal processor 80 includes the function of the extractor 82, which extracts the data of the processing section A. However, the signal processor 80 does not necessarily have to include the function of the extractor 82. The first calculator 83 may receive the processed signal of the current pixel output from the signal converter 70 without the processed signal going through the data storage 81 and may calculate, for example, the distance of the object.

(b) In the above-described embodiments, multiple functions of one component may be achieved by multiple components, or one function of one component may be achieved by multiple components. Alternatively, multiple functions of multiple components may be achieved by one component, or one function achieved by multiple components may be achieved by one component. Part of the structure of the above-described embodiment may be omitted. Alternatively, at least part of the structure of the above-described embodiment may be added to or replaced with the structure of the above-described other embodiment.

(c) Besides the above-described ranging module, the present disclosure may be achieved in various forms such as a system including the ranging module or a ranging method.

What is claimed is:

1. A ranging module comprising:
a transmission driver configured to generate a transmission wave, which is a frequency-swept electromagnetic wave;
a transmitter configured to transmit the transmission wave repeatedly;
a scanner configured to continuously scan a predetermined region per pixel with the transmission wave transmitted from the transmitter without stopping in space;
a scan driver configured to drive the scanner;
a receiver configured to receive a reflected wave generated by reflection of the transmission wave off an object;
a mixer configured to combine, per pixel, the transmission wave and the reflected wave to generate a combined signal;
a signal converter configured to convert the combined signal per pixel generated by the mixer into an electrical signal;
a data storage configured to sequentially save a processed signal per pixel based on the electrical signal converted by the signal converter;
a first calculator configured to calculate a distance to the object from the processed signal corresponding to a current pixel;
a determiner configured to determine whether the distance calculated by the first calculator differs from a preset limit distance, which is a maximum distance calculated by the first calculator in cases where there is no object around the ranging module;
a re-extractor configured to, in response to the determiner determining that the distance calculated by the first calculator differs from the preset limit distance, extract pieces of data of processing sections each corresponding to a sweep time of the transmission wave from a time-series of the processed signals saved in the data storage corresponding from a pixel previous to the current pixel in a scanning direction of the scanner to the current pixel while shifting the processing sections one after another by a time period shorter than the sweep time; and
a second calculator configured to calculate the distance from the data of each processing section extracted by the re-extractor.

2. The ranging module according to claim 1, wherein the determiner is configured to determine that the distance calculated by the first calculator differs from the preset limit distance if the distance has changed from the distance calculated by the first calculator in the pixel previous to the current pixel in the scanning direction of the scanner by a preset judgement threshold value or more.

3. The ranging module according to claim 2, wherein the pixel previous to the current pixel is a pixel immediately preceding the current pixel in the scanning direction.

4. The ranging module according to claim 1, wherein the re-extractor is configured to extract pieces of data of a plurality of the processing sections starting within the time-series of the processed signal corresponding to the pixel immediately preceding the current pixel in the scanning direction of the scanner and the processed signal corresponding to the current pixel.

* * * * *